United States Patent
Besson et al.

(10) Patent No.: US 11,938,966 B1
(45) Date of Patent: Mar. 26, 2024

(54) VEHICLE PERCEPTION SYSTEM VALIDATION

(71) Applicant: Zoox, Inc., Foster City, CA (US)

(72) Inventors: Clement Besson, San Francisco, CA (US); Minsu Jang, San Mateo, CA (US); Antonio Prioletti, Redwood City, CA (US); Peng Wang, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 340 days.

(21) Appl. No.: 17/541,950

(22) Filed: Dec. 3, 2021

(51) Int. Cl.
  *B60W 60/00* (2020.01)
  *B60W 30/095* (2012.01)
  *B60W 40/06* (2012.01)
  *G06N 20/00* (2019.01)

(52) U.S. Cl.
  CPC .... *B60W 60/0015* (2020.02); *B60W 30/0953* (2013.01); *B60W 30/0956* (2013.01); *B60W 40/06* (2013.01); *B60W 60/0013* (2020.02); *G06N 20/00* (2019.01); *B60W 2520/00* (2013.01); *B60W 2554/404* (2020.02); *B60W 2554/80* (2020.02)

(58) Field of Classification Search
  CPC ......... B60W 60/0015; B60W 30/0953; B60W 30/0956; B60W 40/06; B60W 60/0013; B60W 2520/00; B60W 2554/404; B60W 2554/80; G06N 20/00
  See application file for complete search history.

(56) References Cited

U.S. PATENT DOCUMENTS

| 11,715,338 B2 * | 8/2023 | Vejalla | G07C 5/008 |
| | | | 701/31.4 |
| 2020/0351438 A1 * | 11/2020 | Dewhurst | H04N 23/64 |

FOREIGN PATENT DOCUMENTS

| CA | 3066337 | * | 6/2021 | G06N 20/00 |

OTHER PUBLICATIONS

S. Banerjee, B. Samynathan, J. A. Abraham and A. Chatterjee, "Real-Time Error Detection in Nonlinear Control Systems Using Machine Learning Assisted State-Space Encoding," in IEEE Transactions on Dependable and Secure Computing, vol. 18, No. 2, pp. 576-592, Mar. 1-Apr. 2021, doi: 10.1109/TDSC.2019.2903049.*

* cited by examiner

*Primary Examiner* — Brian P Sweeney
(74) *Attorney, Agent, or Firm* — Lee & Hayes, P.C.

(57) ABSTRACT

Techniques for validating operation of a perception system that is configured to detect objects in an environment of a vehicle are described herein. The techniques may include receiving log data representing a real scenario in which the vehicle was traversing an environment. Based at least in part on the log data, an error may be identified that is associated with an output received from the perception system while the vehicle was traversing the environment. In some examples, a determination may be made that a magnitude of the error violates a perception system requirement, the requirement established based on a determination that the magnitude of the error would contribute to an adverse event in an alternative scenario. Based on the magnitude of the error contributing to the adverse event, data associated with the error may be output for use in updating the perception system to at least meet the requirement.

20 Claims, 10 Drawing Sheets

VEHICLE PERCEPTION SYSTEM VALIDATION

BACKGROUND

Autonomous vehicles utilize various systems, methods, and apparatuses to traverse an environment. For instance, autonomous vehicles utilize machine-learned models to navigate through environments where other vehicles, people, buildings, and other objects may be present. In some cases, developing these machine-learned models for use in autonomous vehicle navigation can be challenging. For instance, because autonomous vehicles may utilize multiple other systems and computer-based algorithms to traverse an environment, it can be difficult to validate, in isolation, the operation of specific models used by autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
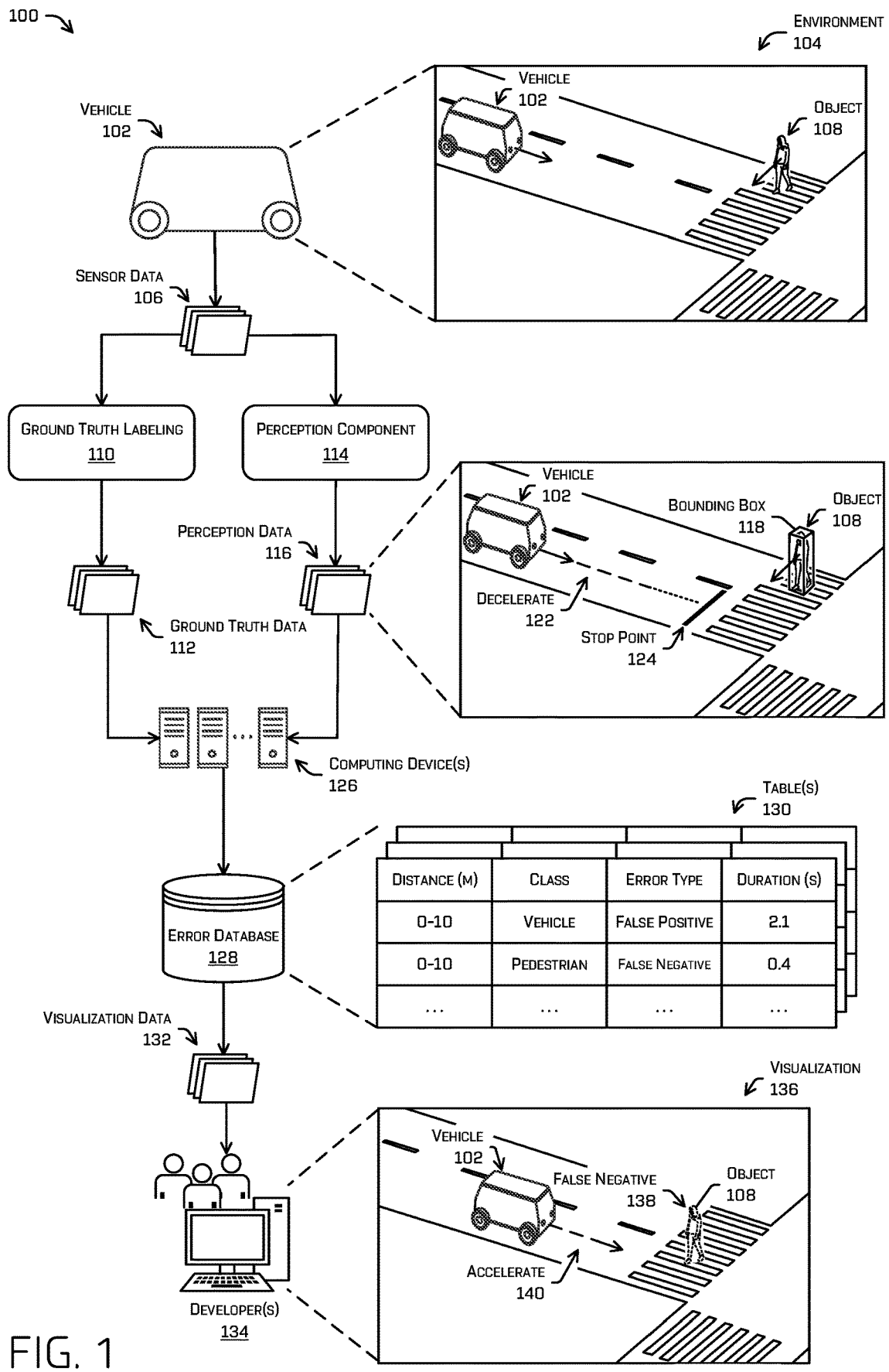
FIG. 1 is a pictorial flow diagram illustrating an example process according to the techniques described herein for determining an effect of an error associated with an output from a perception system of a vehicle.

As noted above, developing machine-learned models for use in autonomous vehicle navigation can be challenging. For instance, because autonomous vehicles may utilize multiple other systems and computer-based algorithms to traverse an environment, it can be difficult to validate, in isolation, the operation of specific models used by autonomous vehicles. Take, for example, a machine-learned model that receives, as inputs, sensor data (e.g., lidar data, radar data, image data, etc.) representing an environment in which a vehicle is operating and outputs one or more regions of interest (e.g., bounding boxes associated with objects in the environment, etc.) associated with the environment. In some instances, developers of the machine-learned model may desire to validate operation of the model in isolation of other systems, models, computer-based algorithms, etc. of the vehicle. However, this can often be a difficult process.

For example, one way that developers have validated operation of machine-learned models is by analyzing vehicle performance when navigating real and/or alternative scenarios. Vehicle performance during real scenarios may be analyzed based on stored log data of the vehicle traversing a real word environment. During a simulation, a simulated vehicle representing a real vehicle may traverse a simulated environment based on simulated data (e.g., simulated sensor data). However, it can be difficult to simulate realistic behavior and attributes of objects (e.g., pedestrians, cyclists, vehicles, animals, buildings, etc.) in the simulated environment, which the machine-learned model may rely on to make predictions. Additionally, in simulations the errors are often simulated as well, and may not represent realistic faults. Further limitations of running simulations include troubles associated with correlating errors to specific systems (e.g., perception systems, planning systems, prediction systems, etc.), which makes it difficult to determine how to improve these vehicle systems.

Described herein are techniques associated with validating performance of a vehicle perception system by determining whether changes to the perception system are improving or degrading performance of the vehicle. In some examples, performance of the vehicle may be measured based at least in part on likelihood of a collision. In some examples, an error model associated with the perception system may be received. The error model may indicate multiple errors associated with outputs of the perception system while the vehicle was traversing a real environment. The multiple errors may include false negative errors in which the perception system failed to detect an object in the environment, false positive errors in which the perception system detected a false object not actually present in the environment, as well as other errors (e.g., object size, object classification, object position, object orientation, etc.). In some examples, each error of the multiple errors indicated in the error model may include one or more attributes associated with the error, such as a duration of the error, a magnitude of the error, a frequency and/or probability of the error, or the like.

In some examples, perception system requirements may be defined to determine whether perception system outputs are meeting requirements. Perception system requirements may include maximum durations of errors, maximum magnitudes of errors, maximum frequencies of errors, and the like. The perception system requirements may be based on, for instance, an effect that a perception system error would have on safety of the vehicle (e.g., a likelihood of the perception system error to cause a collision of the vehicle). In some examples, perception system requirements may be determined based at least in part on a determination that a magnitude of a specific error would contribute to an adverse event (e.g., a collision between the vehicle and an object) in an alternative scenario that is based on a real scenario. For instance, an aspect associated with the real scenario may be altered in the alternative scenario. Based at least in part on the one or more attributes, each individual error may be classified as either meeting or violating a perception system requirement. In some examples, if an error is in violation of a perception system requirement, then log data associated with the vehicle traversing the real environment may be labeled with a ground truth and output for use in updating the perception system (e.g., training a machine learned model of the perception system to correct/avoid the error). The log data may represent the object in the environment at a time of the error.

By way of example, and not limitation, a method according to this disclosure may include techniques of receiving an error model associated with a perception system of a vehicle. In some examples, the vehicle may be an autonomous or semi-autonomous vehicle and the error model may indicate multiple errors associated with outputs of the perception system while the vehicle was traversing an environment. As described herein, a perception system of a vehicle includes one or more machine-learned models, computer-based algorithms, and/or other modules or components for detecting, classifying, and/or tracking objects (e.g., pedestrians, cyclists, vehicles, animals, buildings, vegetation, etc.) in an environment of the vehicle. Accordingly, the multiple errors indicated in the error model may, in some examples, represent differences between objects detected by the perception system relative to a "ground truth" associated with the detected objects. As used herein, a ground truth means the actual characteristics associated with an object during the time in which the vehicle was operating in the environment. For instance, if the perception system detects that an object is a pedestrian, but the object is actually a vehicle, then the ground truth will indicate that the object is a vehicle. Similarly, if the perception system detects that an object is oriented at 60 degrees, but the object is actually oriented at 65 degrees, then the ground truth will indicate that the object is oriented at 65 degrees.

In some examples, the multiple errors indicated in the error model may include false negative errors in which the perception system failed, for a period of time, to detect an object in the environment that is present in the ground truth. Additionally, or alternatively, the multiple errors may include false positive errors in which the perception system detected, for a period of time, a false object that is not actually present in the environment as indicated in the ground truth. Additionally, the multiple errors may include other errors as well, such as errors associated with a size of an object, errors associated with a classification of an object (e.g., a mis-labeling of a car as a pedestrian, a car as a truck, a cyclist as a pedestrian, or the like), errors associated with a position of an object, errors associated with an orientation of an object (e.g., yaw, roll, pitch, etc.), or the like. In some examples, the error model may additionally indicate, for each error of the multiple errors, one or more attributes associated with each error, such as a duration of an error, a magnitude of the error, a frequency and/or probability of the error, or the like.

The techniques may also include determining whether an error of the multiple errors is meeting, exceeding, or, conversely, violating a perception system requirement. In some examples, perception system requirements may include maximum durations of errors, maximum magnitudes of errors, maximum frequencies of errors, or the like. In some examples, the perception system requirements may be based on a probability that a perception system error would cause a collision of the vehicle. In some examples, the perception system requirements may be based on a probability that a perception system error would cause a collision of the vehicle being above a threshold probability. In some examples, the perception system requirements may be based on a cost function associated with performance of the vehicle. In some examples, determining whether the error meets, exceeds, or violates a perception system requirement may be based at least in part on the one or more attributes associated with an error, as well as a type of the error. For instance, if a false negative error persists for longer than a threshold period of time (e.g., 1 second, 2 seconds, 3 seconds, etc.), then that specific false negative error may be classified as violating a perception system requirement. In some instances, the threshold period of time may vary depending on a speed of the vehicle, a speed of object in the environment, how congested/busy the environment is, how far certain objects are from the vehicle, and the like, as further described below.

For example, with respect to false negative errors, a perception requirement may be a threshold duration (e.g., period of time) in which the perception system of the vehicle is to detect the object in order to minimize a probability of a collision between the vehicle and the object or another object (e.g., another vehicle following the vehicle). In one example, the threshold duration to detect the object may be calculated based at least in part on log data (e.g., sensor data such as lidar data, image data, radar data, time of flight data, internal measurement unit data, odometry data, etc.) associated with the vehicle traversing the environment. For instance, the log data may indicate on one or more of a speed of the vehicle, a deceleration rate of the vehicle, a location of the object in the environment, a distance between the vehicle and the location of the object, a trajectory (e.g., speed, acceleration, and/or direction) of the object, a distance between the vehicle and another vehicle following the vehicle, a trajectory of the other vehicle, a deceleration rate of the other vehicle, or the like.

As another example, with respect to false positive errors, a perception requirement may be a threshold duration in which the perception system is to correct the false positive error in order to minimize a probability of the vehicle changing trajectory (e.g., decelerating, swerving, etc.) to avoid collision with the false object. For instance, changing the trajectory of the vehicle to avoid collision with the false object may increase the chances of a collision with another object (e.g., another vehicle following the vehicle, a turning vehicle, etc.). In one instance, the threshold duration to correct the false positive may be determined based on log data indicating one or more of a speed of the vehicle, a deceleration rate of the vehicle, a location of the false object in the environment, a distance between the vehicle and the location of the false object, a predicted trajectory (e.g., speed, acceleration, and/or direction) of the false object, a distance between the vehicle and another vehicle following the vehicle, a trajectory of the other vehicle, a deceleration rate of the other vehicle, or the like. In some instances, the false positive detection (e.g., detecting a dynamic object in the lane when there isn't one) may delay the vehicle and increase a cost function based on travel time, or may cause the vehicle to brake unnecessarily/abruptly, thereby increasing a cost function due to reducing a passenger comfort cost. As such, perception requirements may further be based on the cost function.

In some examples, if an error is in violation of a perception system requirement, then the techniques may also include outputting a visualization associated with the error. The visualization may, in some instances, be usable for updating a machine-learned model of the perception system. For instance, the visualization may be usable as training data for training the machine-learned model, output to a developer for viewing such that the developer may make changes to a parameter of the model, or the like. The visualization may, in some examples, represent the object and the vehicle in the environment during at least the duration of the error. In some examples, the visualization may include at least a portion of the log data that is associated with the error. The portion of the log data may indicate one or more of a classification associated with the object (e.g., whether the object is a pedestrian, cyclists, vehicle, animal, vegetation, building, etc.), a geolocation corresponding with the error and/or the object, or the like. In one example, the visualization is generated based at least in part on the log data.

In some examples, perception system requirements may be determined based at least in part on a determination that a magnitude of a specific error would contribute to an adverse event (e.g., a collision between the vehicle and an object) in an alternative scenario that is based on a real scenario. In some examples, one or more aspects associated with the real scenario may be altered in the alternative scenario in order to determine the perception system requirement. For example, the one or more aspects of the real scenario that can be altered in the alternative scenario may be associated with objects in the environment (e.g., change in size of an object, change in color of an object, change in behavior of an object, change in object velocity, change object trajectory, change in object orientation, change in object location, etc.), the environment itself (e.g., changes in environmental conditions or weather, changes to lighting conditions, changes to lane markings, etc.), or the vehicle (e.g., change in velocity of the vehicle, change in trajectory of the vehicle, etc.).

In some examples, the perception system requirement may be determined based on a worst-case scenario of multiple alternative scenarios in which aspects associated with the object or the environment are altered relative to the scenario. That is, multiple alternative scenarios may be determined based on a real scenario, and the worst-case scenario of those alternative scenarios may be used as a minimum for determining the perception system requirements. In some examples, the adverse event in the alternative scenario may include a collision between the vehicle and an object in the environment, a violation of a comfort score requirement by the vehicle (e.g., getting too close to a collision with an object, braking to aggressively, turning at too high of speed, etc.), or the like.

In some examples, perception system requirements may be determined for multiple different scenarios and/or situations. For instance, perception system requirements may be determined for scenarios in which the vehicle is following another vehicle, scenarios in which a pedestrian is crossing in front of the vehicle, scenarios in which another vehicle is following the vehicle, scenarios in which the vehicle is turning at an intersection where other vehicles are present, or the like. In some examples, the perception system requirements may define magnitudes of perception system errors that can be tolerated without increasing a probability of the vehicle experiencing an adverse event. In this way, the vehicle can traverse an environment from a first location to a second location more safely and efficiently without taking too much time as a result of being over cautious, while at the same time not taking too little of time as a result of being unsafe or reckless.

In some examples, the determination that the magnitude of the error would contribute to an adverse event (e.g., collision between the vehicle and the object) may be based at least in part on a first principle analysis using one or more of a speed of the vehicle, a speed of the object, a deceleration rate of the vehicle, a deceleration rate of the object, a response time of the vehicle, a response time of the object, a distance between the vehicle and the object, and the like. That is, while in some examples a simulation may be run to determine whether the vehicle would experience and adverse event, in other examples first principle analysis (e.g., mathematical equations, physics, etc.) may be used to determine whether an adverse event could occur.

These first order analyses or other scenarios may vary several aspects of a scenario while keeping others within a bound to obtain a worst-case criteria for use to determine a requirement for a perception component. For example, multiple scenarios can be run wherein a pedestrian crosses a road in front of an autonomous vehicle equipped with a perception system for which a requirement is desired. The scenarios may vary the time of day, traffic conditions, type of pedestrian (e.g., heigh, dress, speed, etc.), and/or conditions of the vehicle. This can be used to, for example, ensure that a requirement used to detect the pedestrian (e.g., a time and/or distance requirement) can take the worst case needed to assign a requirement to detect the pedestrian to ensure that an adverse event does not occur. Although this is one example, it should be understood that the techniques can be used in multiple objects for multiple scenarios. Using these techniques, a set of requirements can be generated that can be applied to a perception component of a vehicle in order to verify if a perception component may operate without causing an adverse event when applied to a vehicle.

In some examples, the analyses can take into account varying operational design domains. For example, the weather can be varied which may affect a friction coefficient of a surface that a vehicle is operated on and therefore a distance and/or time required to safely stop the vehicle. Using the aforementioned pedestrian example, snowy or icy weather may increase the time or distance needed to detect the pedestrian to ensure that the vehicle has adequate distance to prevent contacting the pedestrian. In other examples, different requirements can be generated for different operational design domains (e.g., times of day, lighting conditions, weather conditions, urban vs suburban settings, geographic locations, etc.).

A requirement, as used herein, can define a magnitude of a requirement for a set of conditions (e.g., a maximum time that a pedestrian is correctly identified in a given distance). Other attributes or conditions regarding the requirement can be varied as disclosed herein. For example, aspects of the object can be varied (e.g., if the requirement is directed to a pedestrian, the speed, height, dress, body posture, etc. of the pedestrian can be altered). For example, the maximum speed that a pedestrian may travel may be used as this may result in the least amount of time available for a vehicle to react to. Attributes of the pedestrian may be varied to a worst case that may be more difficult for a perception system to detect. Attributes of the vehicle may also be changed to account for tire or sensor degradation (or other component), for example. In examples, the requirements can be based on capabilities of downstream components of the vehicle (e.g., a version of planner, a version of prediction, or versions of hardware vehicle components). In other words, the requirements may be tied to a certain software or hardware configuration of downstream or upstream components (e.g., sensors). In examples, a worst-case reaction time may also be applied to account for multiple configurations of upstream or downstream vehicle components.

Although a pedestrian crossing a road is given as an example, it should be understood that the techniques can be used in multiple other scenarios and/or for other objects. For example, vehicles can be varied to change size, shapes, types, color, conditions, wheels, acceleration or brakes performances, driver behaviors, driver reaction times, etc. Additionally, the positions and/or environment can be altered through the use of the analyses or simulations disclosed herein.

Using the disclosed techniques, requirements may be developed for a perception component of a vehicle that can be quantifiable and used to determine whether revisions of a perception component would be adequate for operation with an autonomous vehicle. As should be understood, a vehicle's perception system may encounter many varied scenarios and objects within a real world and it may be difficult to define a set of requirements that accounts for many different scenarios but are still testable as being quantifiable, limited in number, and still be representative of the different scenarios that the system may component. The disclosed techniques provide a framework to solve these issues.

According to the techniques described herein, the performance of vehicle perception systems and machine-learned models can be improved by validating whether errors are violating perception requirements, which allows identification of the errors that need more developmental attention. In the context of autonomous vehicles, the techniques described herein provide for more accurate machine-learned models, which can increase the safety of autonomous vehicles by making more accurate predictions, which can promote safer decision making in time-sensitive environments to further avoid collisions that a human likely could not avoid. Additionally, the disclosed techniques promote optimization of machine-learned models, as well as insight into how changes and/or updates to machine-learned models impact the models' accuracy in making predictions/detections. Additionally, the disclosed techniques may be used to determine how sensitive other vehicle systems (e.g., planning and/or prediction components) are to perception errors and to improve the tolerance of the other vehicles systems to perception errors. These and other improvements will be readily apparent to those having ordinary skill in the art.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in an aviation or nautical context, or in other machine-learning and training contexts. Furthermore, the techniques described herein can be used with real data (e.g., captured using sensor(s)), simulated data (e.g., generated by a simulator), or any combination of the two.

FIG. 1 is a pictorial flow diagram illustrating an example process 100 according to the techniques described herein for determining an effect of an error associated with an output from a perception system of a vehicle. In examples, the vehicle 102 may be associated with one or more sensor components. In at least one example, the sensor component (s) may capture sensor data 106 associated with an environment 104 surrounding the vehicle 102. The environment 104 may include one or more objects, such as the object 108, which is a pedestrian. In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data 106 associated with the environment 104, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc. In some examples, the sensor data 106 may be referred to herein as "log data," which may be stored for an infinite period of time.

In at least one example, the sensor data 106 may be sent to a ground truth labeling component 110. The ground truth labeling component 110 may include functionality for generating ground truth data 112 (e.g., ground truth perception data) based on the sensor data 106. For example, the ground truth data 112 may include bounding boxes (e.g., similar to or the same as the bounding boxes 118) for the objects 108 represented in the sensor data 106. In some examples, the ground truth data 112 may be generated or otherwise determined by a human labeler and/or a computer-based algorithm. For instance, in one example, the human labeler may generate the ground truth data 112 while, in other examples, the computer-based algorithm may generate the ground truth data 112. In at least one example, the computer-based algorithm may generate initial ground truth data and the human labeler may confirm or make corrections to the initial ground truth data to generate the ground truth data 112. In any way, the ground truth data 112 represents the actual environment 104 represented in the sensor data. In other words, errors between the ground truth data 112 and the environment 104, as the environment 104 actually exists, should be very minimal.

Additionally, the sensor data 106 may also be input to a perception component 114 that may be configured for use in the vehicle 102. The perception component 114 may generate perception data 116 based at least in part on input sensor data 106. In one example, the perception component 114 includes one or more machine-learned models and/or other computer-based algorithms for generating the perception data 116. The perception data 116 output by the perception component 114 may include, among other things, bounding boxes associated with the objects in the environment 104, such as the bounding box 118 associated with the object 108, as well as trajectories associated with the objects, classifications associated with the objects, or the like. In some examples, the bounding box 118 may be indicative of information associated with the object 108, such as a size (e.g., volume, length, width, height, etc.), extent, position, location, orientation, and the like. In some instances, a trajectory may represent a speed, velocity, acceleration, etc. associated with a detected object, as well as, or in addition to, a direction of travel associated with the detected object. In some examples, based at least in part on the perception data, a planned trajectory of the vehicle 102 may be determined. For instance, as shown in FIG. 1, since the perception component 114 detected the object 108 crossing the crosswalk, the vehicle 102 may decelerate 122 and come to a stop at a stop point 124 in order to yield for the object 108.

In some examples, the computing device(s) 126 may receive the ground truth data 112 and the perception data 116. Based at least in part on the ground truth data 112 and the perception data 116, the computing device(s) 126 may generate one or more error model(s) 128. The error model(s) 128 may be in the form of one or more table(s) 130. The error model(s) 128 may comprise discrete probability models conditioned on several parameters, such as object distance, error magnitude, error duration, etc., that describe the likelihood or frequency in which the perception component 114 makes a certain error that falls within a predefined error group. In examples, separate error models may be built for different perception component outputs, object types, and interactions the object had with a planner component of the vehicle 102. By way of example, and not limitation, error types that may be captured in the error model(s) 128 may include frame-based errors, such as object position, velocity, yaw, size, and extent, as well as event-based errors, such as false negatives, false positives, yaw flips, over segmentation, or the like. Additionally, object types (e.g., classes) that may be included in an error model(s) 128 may include vehicles, pedestrians, cyclists, animals, etc. In some instances, durations of errors may also be indicated in the table(s) 130 of the error model(s) 128.

In some examples, per-frame errors may be determined by calculating a perception error based on a difference between the perception data 116 and the ground truth data 112, grouping the perception errors based at least in part on object distance and error magnitude, and then aggregating the grouped errors to generate an error probability table. For example, if there are total of 100 frames at a distance of 60 meters, and 90 of the 100 frames have a velocity error between 0-0.1 meters per second (m/s), and the remaining 10 frames have a velocity error between 0.1-0.2 m/s, then the error group at 0.1 m/s at the distance of 60 meters has a probability of 0.9, and the error group at 0.2 m/s at the distance of 60 meters has a probability of 0.1.

In some examples, per-event errors may be determined based at least in part on an interaction period associated with each object 108. For example, if a pedestrian is flagged at time 1.0 seconds, and the flag disappeared at 1.5 seconds but then reappeared at 2 seconds and lasted until 4 seconds, the entire period from 1-4 seconds may be considered. Based on the period, the error duration may then be calculated at various distances.

In some examples, visualization data 132 associated with certain errors between the ground truth data 112 and the perception data 116 may be output by the computing device(s) 126 to one or more developer(s) 134. The developer(s) 134 may utilize visualization data 132 based on the visualization data 132 to update the perception component 114 and/or one or more machine-learned models of the perception component 114. A visualization 136 may illustrate an effect that the perception error has on a behavior of the vehicle 102. For instance, because of the false negative error 138 associated with the object 108, the vehicle 102 may begin to accelerate 140 instead of decelerating to a stop at the stop point 124 in order to yield to the object 108.

In some examples, the visualization 136 may be displayed based at least in part on the ground truth data 112 and on the perception data 116 (e.g., log data). In some examples, the visualization data 132 may be selected by the computing device(s) 126 for output based on the perception error causing a collision of the vehicle 102 or the perception error violating a perception system requirement, as described herein. In some examples, the visualization data 132 may include multiple visualizations associated with multiple different perception errors.

Based on the visualization 136, the developer(s) 134 may update the perception component 114 to minimize the perception error (e.g., reduce the duration of a false negative error or a false positive error, reduce the likelihood of a collision of the vehicle, etc.). For instance, the developer(s) 134 may retrain the perception component 114 or one or more machine-learned models of the perception component 114 using a new dataset, change a weighting of a cross function of a machine-learned model of the perception component 114, and the like. After the perception component 114 has been updated, the updated version of the perception component 114 may be sent to one or more vehicles, including the vehicle 102, for use in traversing a real environment.

Figure 2:
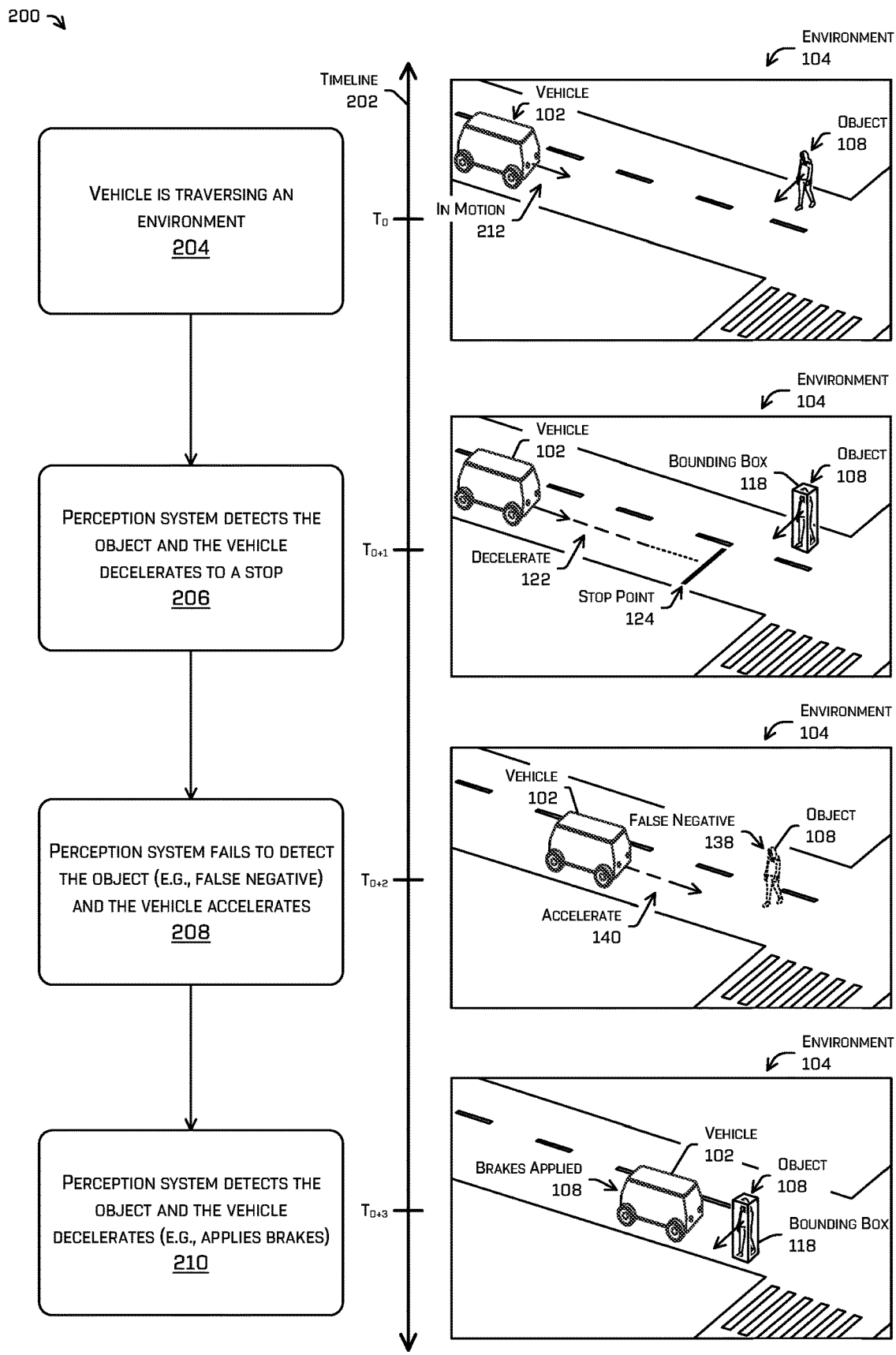
FIG. 2 is a pictorial flow diagram illustrating an example sequence associated with a false negative error output by the perception system of the vehicle.

FIG. 2 is a pictorial flow diagram illustrating an example sequence 200 associated with a false negative error output by the perception system of the vehicle. The sequence 200 is described with respect to a timeline 202 in which a first point $T_0$ on the timeline 202 represents a first time, a second point $T_{0+1}$ on the timeline 202 represents a second time after the first time, a third point $T_{0+2}$ on the timeline 202 represents a third time after the second time, and a fourth point $T_{0+3}$ on the timeline 202 represents a fourth time after the third time.

At operation 204 at the time $T_0$, the vehicle 102 is in motion 212 as it is traversing the environment 104, and the object 108, which is a pedestrian, is crossing the road at a crosswalk. At operation 206 at the time $T_{0+1}$, the perception system of the vehicle 102 detects the object 108 in the environment 104 and the vehicle 102 begins to decelerate 122 to come to a stop at a stop point 124. In this way, the vehicle 102 can yield to the object 108.

At operation 208 at the time $T_{0+2}$, the perception system of the vehicle 102 outputs a false negative error 138 in which the perception system fails to detect the object 108 in the environment 104, and the vehicle 102 accelerates 140 in response to the perception error indicating that the roadway is clear. In some instances, the duration of the false negative error 138 may be 1 second, 2 seconds, 3 seconds, etc. before the vehicle 102 changes its trajectory due to the false negative error 138.

At operation 210 at the time $T_{0+3}$, the perception system of the vehicle 102 detects the object 108 in the environment 104. Responsive to the perception system detecting the object 108, the vehicle may decelerate to a stop to yield to the object 108 and avoid a collision with the object 108.

The sequence 200 illustrates an example in which a duration of the false negative error 138 is critical and is to be minimized. For instance, if the duration of the false negative between times $T_{0+2}$ and $T_{0+3}$ were longer, the perception system of the vehicle 102 may not have detected the object 108 in time and the vehicle 102 may have collided with the object 108. However, because the duration of the false negative error 138 has been minimized, the vehicle 102 was able to stop before colliding with the object 108.

Figure 3:
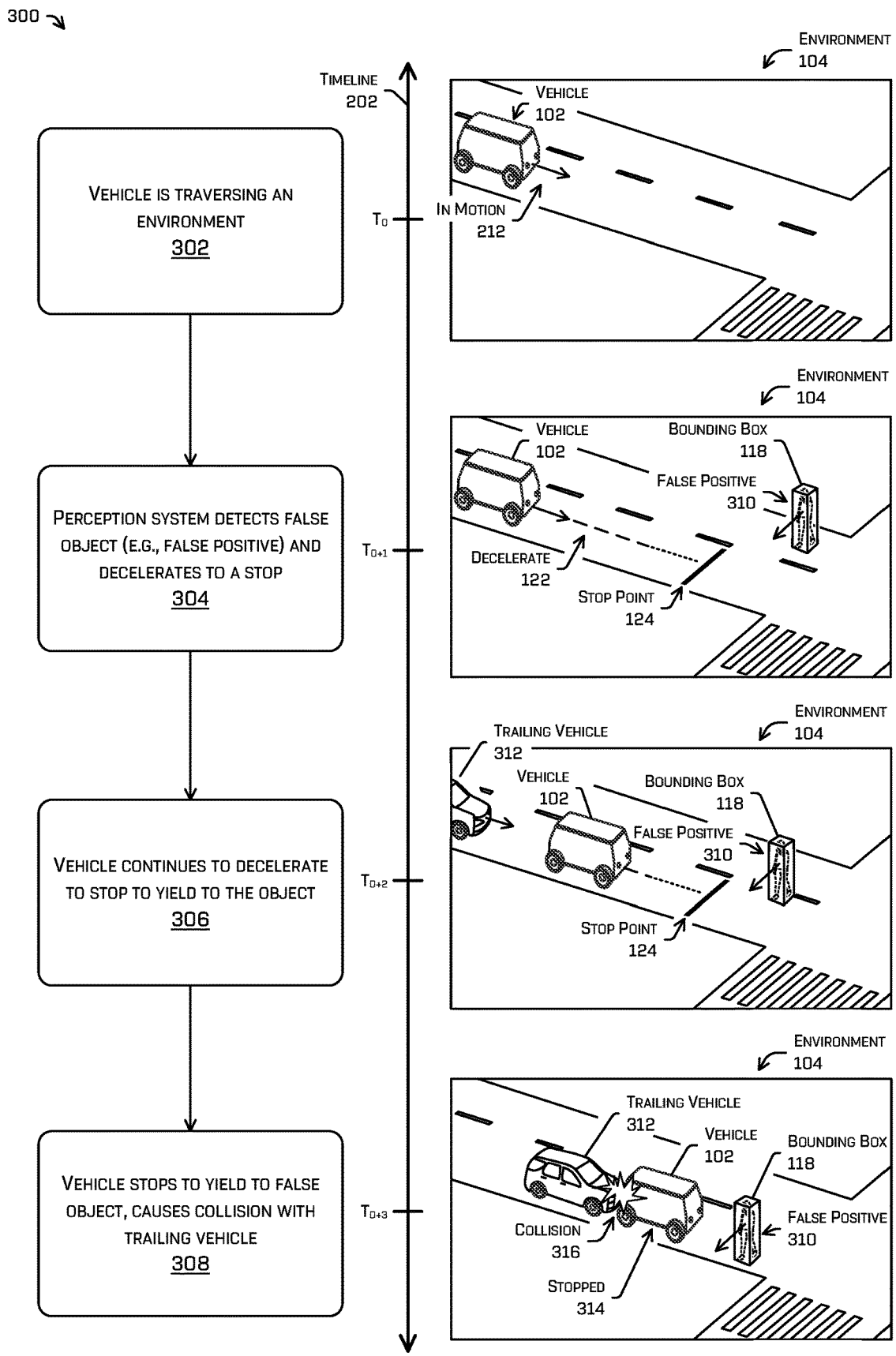
FIG. 3 is a pictorial flow diagram illustrating an example sequence associated with a false positive error output by the perception system of the vehicle.

FIG. 3 is a pictorial flow diagram illustrating an example sequence 300 associated with a false positive error output by the perception system of the vehicle. The sequence 300 is also described with respect to the timeline 202, as in the above example of FIG. 2.

At operation 302 at the time $T_0$, the vehicle 102 is in motion 212 as it is traversing the environment 104, and no objects are present in the environment 104. At operation 304 at the time $T_{0+1}$, the perception system of the vehicle 102 outputs a false positive error 310 in which the perception system detects a presence of a false object that is not actually present in the environment 104. Responsive to the false positive error 310, the vehicle 102 begins to decelerate 122 to a stop at a stop point 124 to yield for the false object.

At operation 306 at the time $T_{0+2}$, the perception system of the vehicle 102 continues to output the false positive error 310 and the vehicle 102 continues to decelerate to stop at the stop point 124. However, at the time $T_{0+2}$, a trailing vehicle 312 is also in the environment 104 following a path of the vehicle 102.

At operation 308 at the time $T_{0+3}$, the vehicle is stopped 314 to yield to the false object, thereby causing a collision 316 with the trailing vehicle 312. For instance, the trailing vehicle 312 may have been following too closely to the vehicle 102, may not have expected the vehicle 102 to stop because there was no object in the environment 104, or the like.

The sequence 300 illustrates an example in which a duration of the false positive error 310 is critical and is to be minimized. For instance, if the duration of the false positive error 310 between times $T_{0+1}$ and $T_{0+3}$ was shorter, or if no false positive error 310 occurred at all, the vehicle 102 would not have stopped 314 for the false object and caused the collision 316 with the trailing vehicle 312. However, because the duration of the false positive error 310 was too long and in violation of a perception system requirement, the vehicle 102 caused a collision 316. The sequence 300 is an example of an error that the techniques of this disclosure would provide a visualization for in order to help develop a better perception system by focusing on errors that cause collisions or unsafe vehicle behavior.

Figure 4:
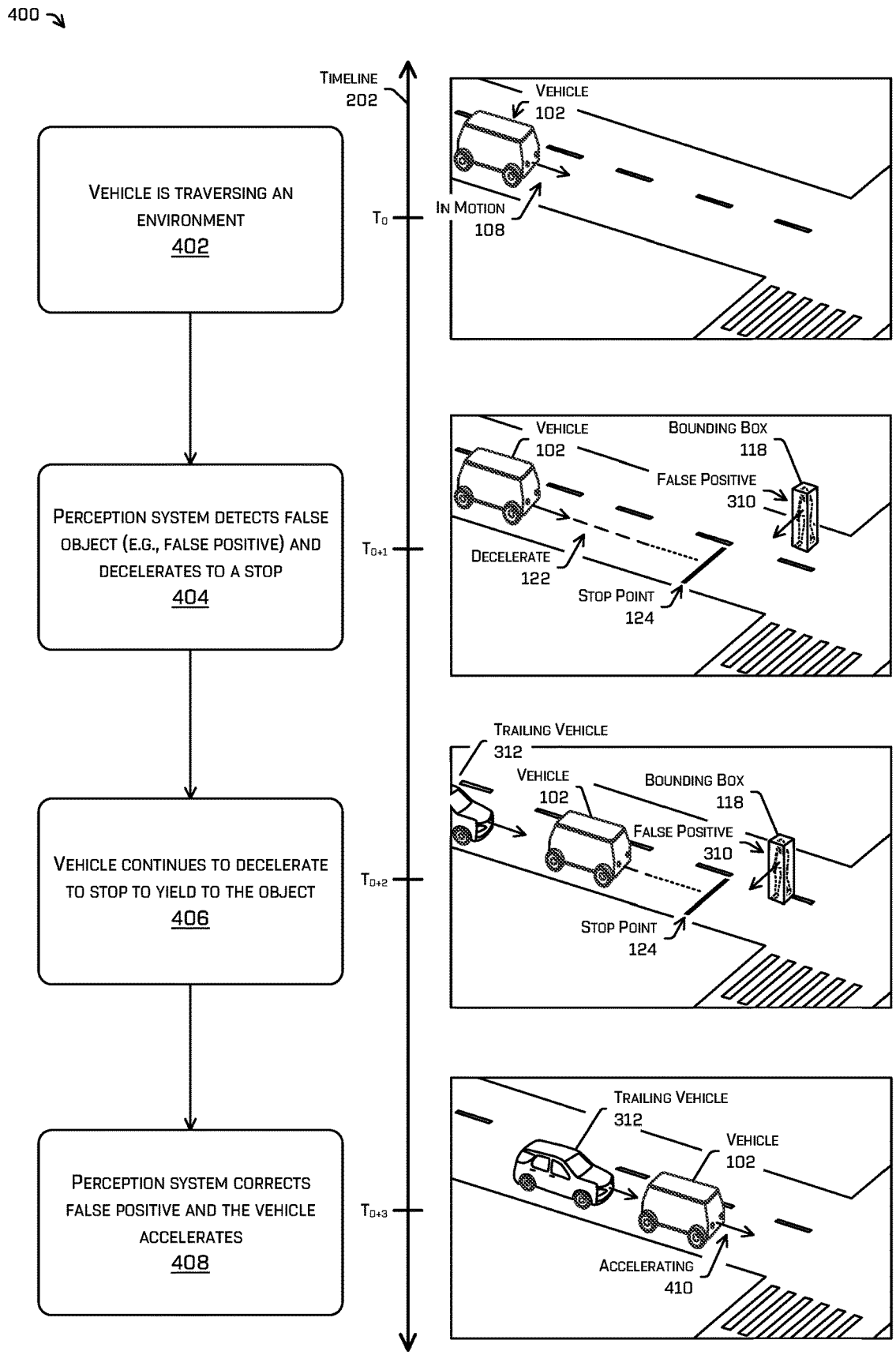
FIG. 4 is a pictorial flow diagram illustrating another example sequence associated with a false positive error output by the perception system of the vehicle.

FIG. 4 is a pictorial flow diagram illustrating another example sequence 400 associated with a false positive error output by the perception system of the vehicle. The sequence 400 is also described with respect to the timeline 202, as in the above examples of FIGS. 2 and 3.

At operation 402 at the time $T_0$, the vehicle 102 is in motion 212 as it is traversing the environment 104, and no objects are present in the environment 104. At operation 404 at the time $T_{0+1}$, the perception system of the vehicle 102 outputs a false positive error 310 in which the perception system detects a presence of a false object that is not actually present in the environment 104. Responsive to the false positive error 310, the vehicle 102 begins to decelerate 122 to a stop at a stop point 124 to yield for the false object.

At operation 406 at the time $T_{0+2}$, the perception system of the vehicle 102 continues to output the false positive error 310 and the vehicle 102 continues to decelerate to stop at the stop point 124. However, at the time $T_{0+2}$, a trailing vehicle 312 is also in the environment 104 following a path of the vehicle 102.

At operation 408 at the time $T_{0+3}$, the perception system corrects the false positive error and the vehicle 102 begins accelerating 410 to resume its original trajectory since there is no object the vehicle 102 needs to yield for. Because the duration of the false positive error 310 has been minimized relative to the example sequence 300 of FIG. 3, the vehicle 102 was able to begin accelerating 410 and avoid a collision with the trailing vehicle 312.

Figure 5:
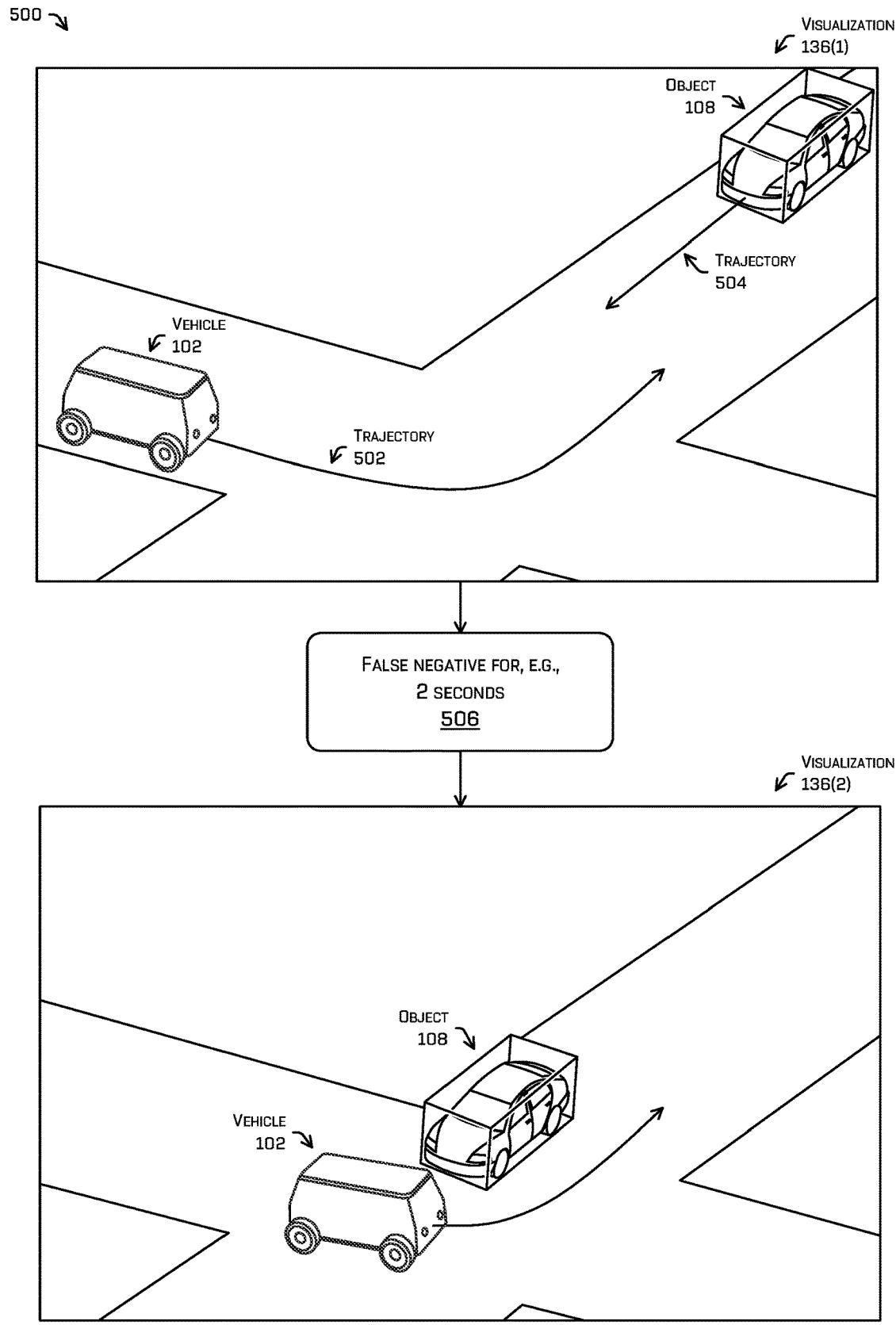
FIG. 5 illustrates an example in which a false negative error lasts for too long based on a speed of another vehicle, which if left unchecked could compromise safety of the vehicle.

FIG. 5 illustrates an example 500 in which a false negative error lasts for too long based on a speed of another vehicle, which if left unchecked could compromise safety of the vehicle. In the first visualization 136(1), the vehicle 102 is about to follow a trajectory 502 to make a left hand turn through an intersection. The object 108, which is another vehicle, is approaching the intersection following another trajectory 504 in which the length of the trajectory 504 arrow corresponds with a speed of the object 108 (e.g., the object 108 moving at a high speed). The visualization 136(1) is associated with a first instance of time.

At a second instance of time, at operation 506, the perception system of the vehicle 102 experiences a false negative for, for instance, 2 seconds. Because of the false negative, the vehicle 102 attempts to cross the intersection. However, because the speed of the object 108 is a high speed, the object 108 traverses a greater distance over the two second period and as the vehicle 102 is in the intersection as shown in the second visualization 136(2), a potential collision occurs.

Figure 6:
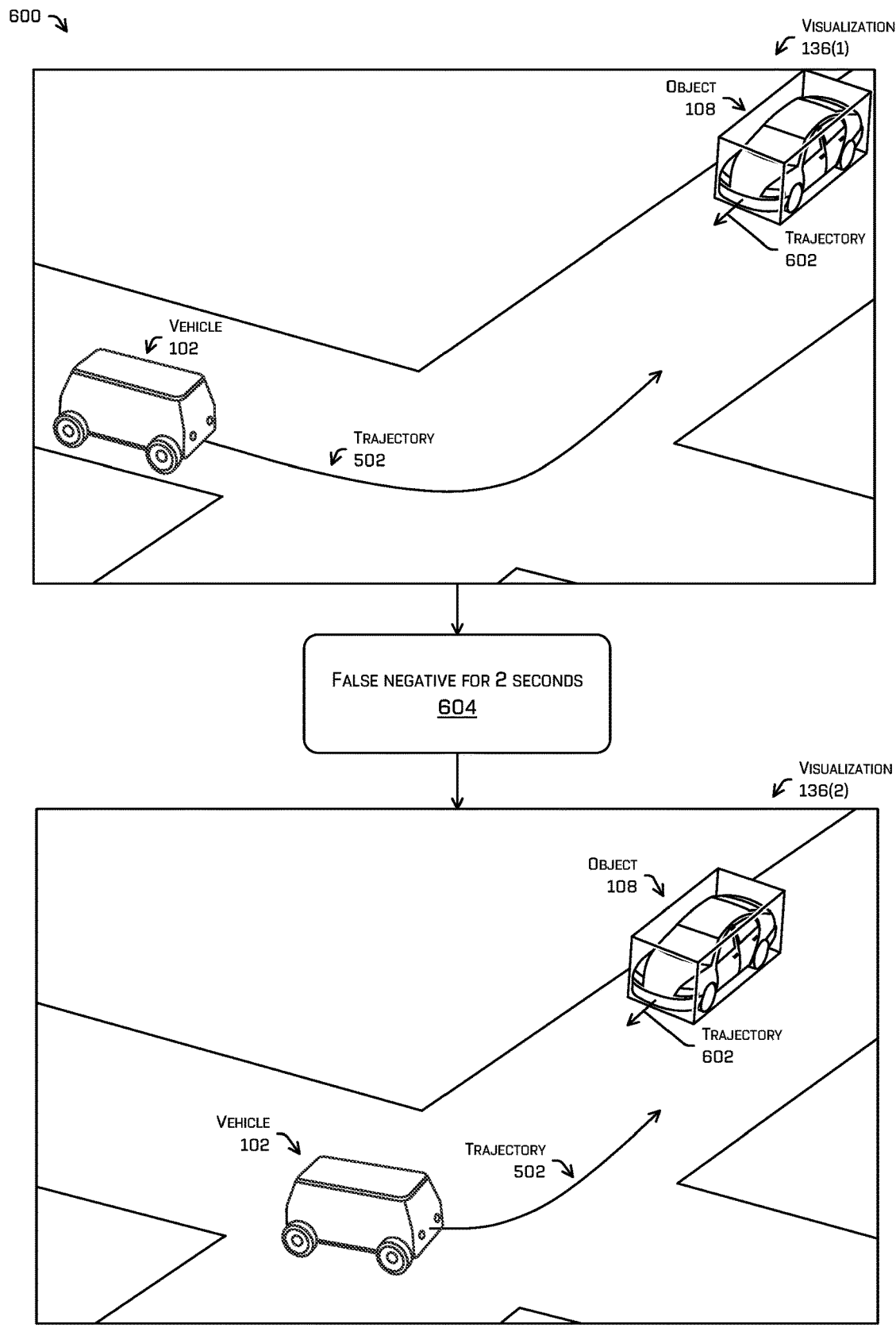
FIG. 6 illustrates an example in which a false negative error does not compromise safety of the vehicle based on a speed of another object.

FIG. 6 illustrates an example 600 in which a false negative error does not compromise safety of the vehicle based on a speed of another object. In the first visualization 136(1), the vehicle 102 is about to follow the trajectory 502 to make the left hand turn through the intersection. The object 108, which is another vehicle, is approaching the intersection following another trajectory 602 in which the length of the trajectory 602 arrow corresponds with a speed of the object 108 (e.g., the object 108 moving at a low speed). The visualization 136(1) is associated with a first instance of time.

At a second instance of time, at operation 604, the perception system of the vehicle 102 experiences a false negative for, for instance, 2 seconds. Because of the false negative, the vehicle 102 attempts to cross the intersection. However, because the speed of the object 108 is a low speed, the object 108 traverses a shorter distance over the two second period (relative to FIG. 5) and as the vehicle 102 is in the intersection as shown in the second visualization 136(2), a safe distance exists between the vehicle 102 and the object 108.

Figure 7:
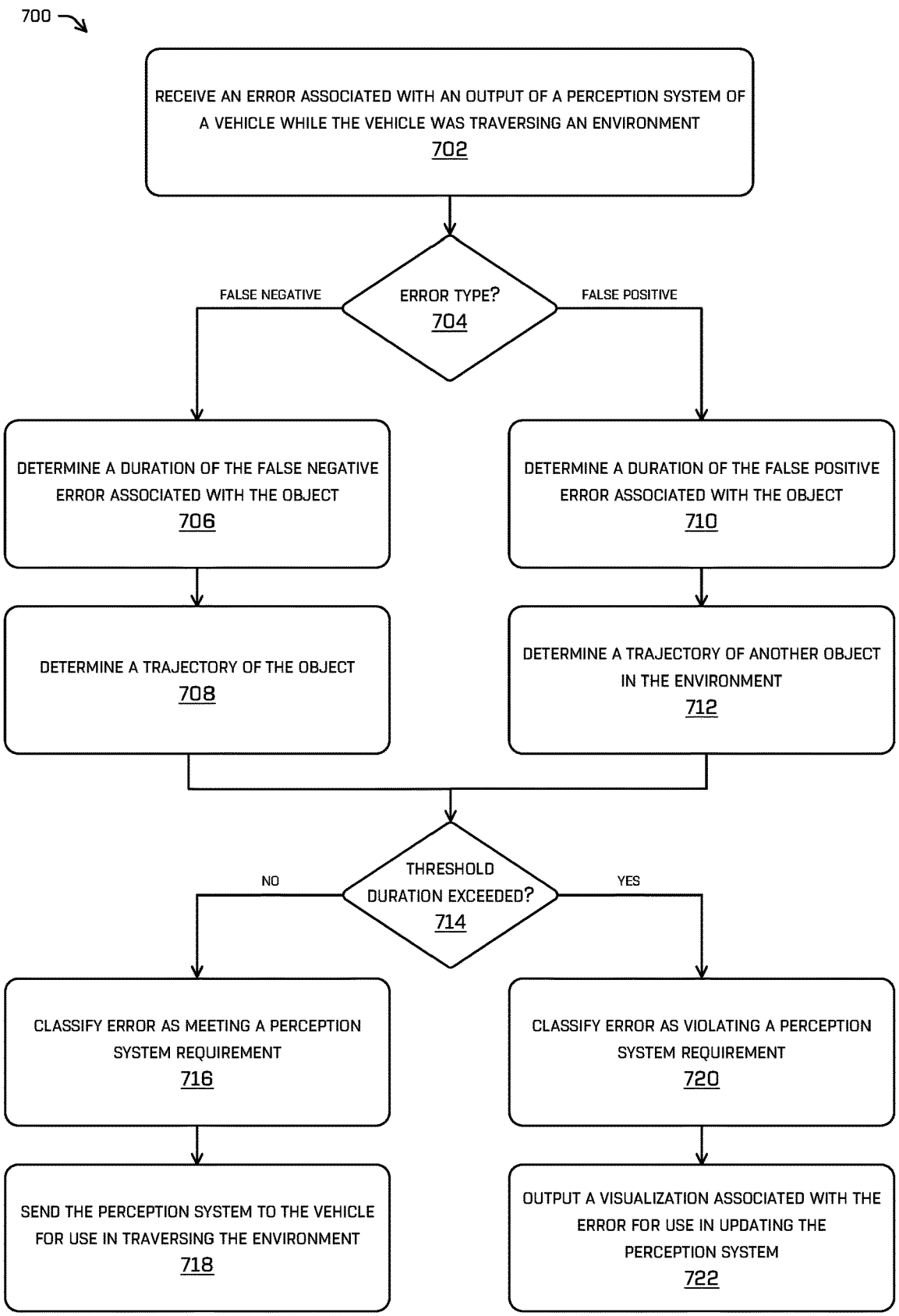
FIG. 7 is a flowchart illustrating an example process associated with validating outputs of a perception system of an object.

FIG. 7 is a flowchart illustrating an example process 700 associated with validating outputs of a perception system of a vehicle. By way of example, the process 700 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 700, the order in which the operations are described is not intended to be construed as a limitation, and any number of the described operations can be combined (or omitted) in any order and/or in parallel to implement the process 700. In some examples, multiple branches represent alternate implementations that may be used separately or in combination with other operations discussed herein. The process 700 illustrated may be described with reference to components and elements described above with reference to FIG. 1 for convenience and ease of understanding. However, the process 700 is not limited to being performed using these components, and the components are not limited to performing the process 700.

The process 700 begins at operation 702, which includes receiving an error model associated with a perception system of a vehicle, the error model indicating one or more errors associated with outputs of the perception system while the vehicle was traversing an environment. For instance, the computing device(s) 126 may receive the error model indicating one or more errors associated with outputs of the perception component 114 of the vehicle 102.

At operation 704, the process 700 includes determining a type of error associated with a first error of the one or more errors indicated in the error model. For instance, if the error is a false negative error, the process 700 proceeds to operation 706. Conversely, if the error is a false positive error, the process 700 proceeds to operation 710. However, other types of errors are contemplated, such as yaw flip error (e.g., the perception system detects the object as facing the opposite direction than ground truth), or the like.

At operation 706, the process 700 includes determining a duration of the false negative error associated with the object. For instance, the error model table 130 may indicate a duration of the false negative error. At operation 708, the process 700 includes determining a trajectory of the object. For instance, the computing device(s) may determine, based on log data, the trajectory of the object 108.

At operation 710, the process 700 includes determining a duration of the false positive error associated with the object. For instance, the error model table 130 may indicate a duration of the false positive error. At operation 712, the process 700 includes determining a trajectory of another object in the environment. For instance, the computing device(s) may determine, based on log data, the trajectory of the object 108.

At operation 714, the process 700 includes determining whether the duration of the error meets or exceeds a threshold duration. If the duration of the error does not meet or exceed the threshold duration, the process 700 proceeds to operation 716. However, if the duration of the error meets or exceeds the threshold duration, the process 700 proceeds to operation 720. In some examples, the threshold duration may be determined based on a trajectory and/or a location of the object 108 relative to the vehicle 102. For instance, if an object is moving at a high speed, the threshold duration may be a shorter period of time, whereas if the object is moving at a low speed, the threshold duration may be a longer period of time. In some instances, the threshold duration for false positive errors may be a shorter period of time relative to the threshold duration for false negative errors.

At operation 716, the process 700 includes classifying the error as meeting a perception system requirement. For instance, the computing device(s) 126 may classify the error as meeting a perception system requirement based at least in part on the duration of the error being less than the threshold duration. At operation 718, the process 700 includes sending the perception system to the vehicle for use in traversing the environment. For instance, based at least in part on the error meeting the perception system requirement, the computing device(s) 126 may send the perception system to the vehicle 102. In some examples, the perception system may be sent to the vehicle 102 if a threshold number of errors associated with outputs of the perception system are meeting perception system requirements.

At operation 720, the process 700 includes classifying the error as violating a perception system requirement. For instance, the computing device(s) 126 may classify the error as violating a perception system requirement based at least in part on the duration of the error meeting or exceeding the threshold duration. At operation 722, the process 700 includes outputting a visualization associated with the error for use in updating the perception system. For instance, the computing device(s) 126 may output visualization data 132 associated with a visualization 136. In some examples, the visualization 136 may be based at least in part on log data, such as the ground truth data 112 and/or the perception data 116. In some instances, the developer(s) 134 may utilize the visualization to update the perception system.

Figure 8:
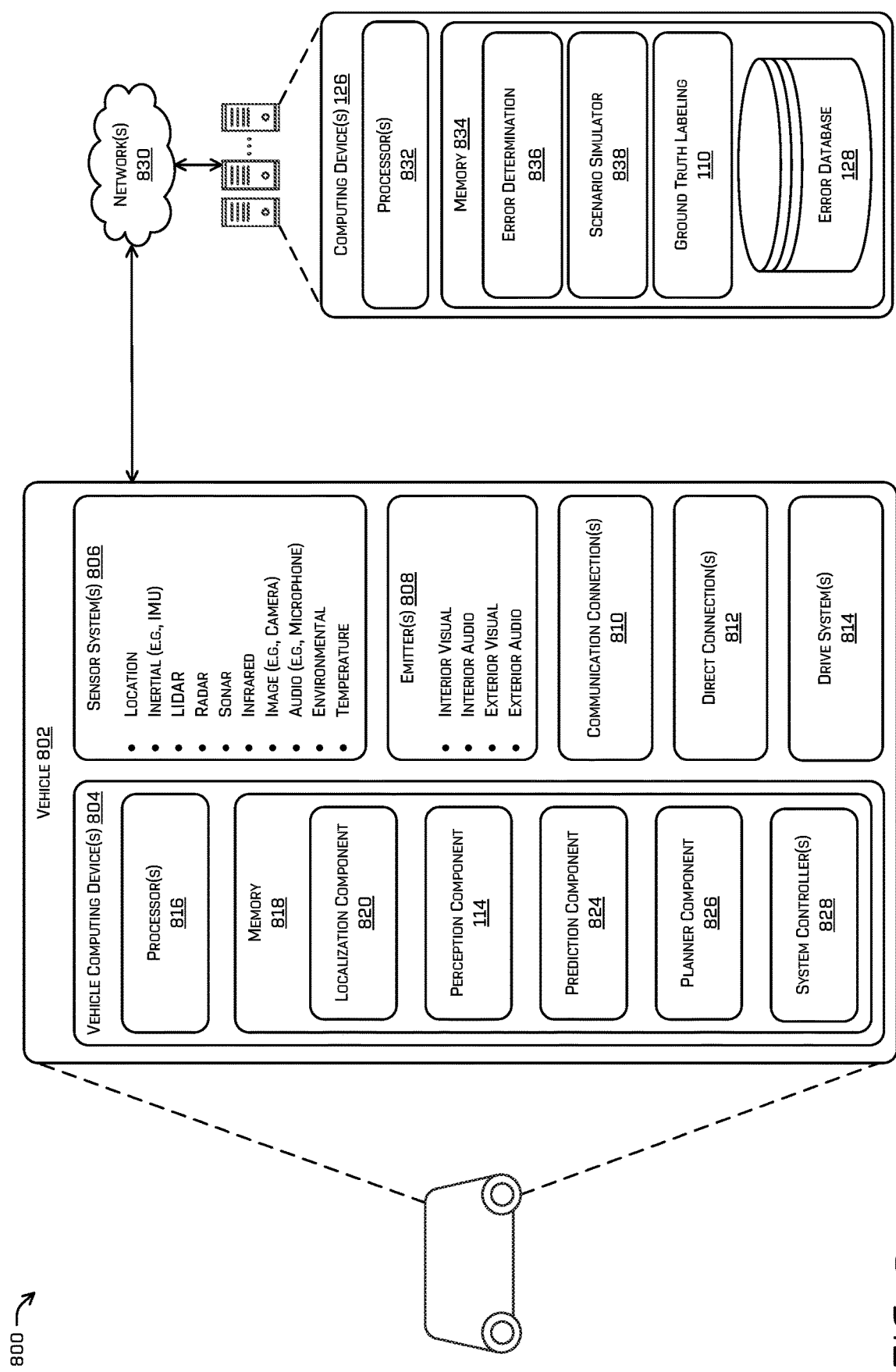
FIG. 8 is a block diagram illustrating an example system that may be used for performing the techniques described herein.

FIG. 8 is a block diagram illustrating an example system 800 that may be used for performing the techniques described herein. In at least one example, a vehicle 802, which can correspond to the vehicle 102 described above with reference to FIGS. 1-6, can include one or more vehicle computing devices 804, one or more sensor systems 806, one or more emitters 808, one or more communication connections 810, at least one direct connection 812, and one or more drive systems 814.

In at least one example, a vehicle 802 can be an autonomous vehicle configured to operate according to a Level 8 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 802 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 802 is an autonomous vehicle; however, the vehicle 802 could be any other type of vehicle. While only a single vehicle 802 is illustrated in FIG. 8, in a practical application, the example system 800 can include a plurality of vehicles, which, in some examples, can comprise a fleet of vehicles.

The vehicle computing device(s) 804 can include processor(s) 816 and memory 818 communicatively coupled with the processor(s) 816. In the illustrated example, the memory 818 of the vehicle computing device(s) 804 stores a localization component 820, the perception component 114, a prediction component 824, a planner component 826, and one or more system controllers 828.

In at least one example and as described above, the localization component 820 can determine a pose (position and orientation) of the vehicle 802 in relation to a local and/or global map based at least in part on sensor data received from the sensor system(s) 806 and/or map data associated with a map of an environment in which the vehicle 802 is operating. In at least one example, the localization component 820 can include, or be associated with, a calibration component that is capable of performing operations for calibrating (determining various intrinsic and extrinsic parameters associated with any one or more of the sensor system(s) 806), localizing, and mapping substantially simultaneously.

In at least one example, the perception component 114 can perform object detection, segmentation, and/or classification based at least in part on sensor data received from the sensor system(s) 806. In at least one example, the perception component 114 can receive raw sensor data (e.g., from the sensor system(s) 806). In at least one example, the perception component 114 can receive sensor data and can utilize one or more processing algorithms and/or machine-learned models to perform object detection, segmentation, and/or classification with respect to object(s) identified in the sensor data. In some examples, the perception component 114 can associate a bounding region (e.g., bounding box or otherwise an instance segmentation) with an identified object and can associate a confidence score associated with a classification of the identified object with the identified object.

The prediction component 824 can receive sensor data from the sensor system(s) 806, map data, and/or perception data output from the perception component 114 (e.g., processed sensor data), and can output predictions associated with one or more objects within the environment of the vehicle 802. Predictions can include predicted trajectories associated with objects in the environment in which the vehicle 802 is operating.

The planner component 826 may receive data, information, and/or outputs from the localization component 820, the perception component 114, the prediction component 824, as well as map data, and may generate one or more proposed vehicle operations (e.g., proposed trajectories). Additional details of localization components, perception components, prediction components, and/or planner components that are usable can be found in U.S. Pat. No. 9,812,123, issued on Apr. 4, 2017, and U.S. Pat. No. 10,383,390, issued on Jul. 16, 2019, the entire contents of both of which are incorporated by reference herein in their entirety and for all purposes. In some examples (e.g., where the vehicle 802 is not an autonomous vehicle), one or more of the aforementioned components can be omitted from the vehicle 802.

In at least one example, the vehicle computing device(s) 804 can include one or more system controllers 828, which can be configured to control steering, propulsion, braking, safety, emitters, communication, and other systems of the vehicle 802. These system controller(s) 828 can communicate with and/or control corresponding systems of the drive system(s) 814 and/or other systems of the vehicle 802.

While the components described above are illustrated as "onboard" the vehicle 802, in other implementations, the components can be remotely located and/or accessible to the vehicle 802. For instance, the component can be remotely located on the computing device(s) 126 and accessible to the vehicle 802 via one or more network(s) 830. Furthermore, while the components are described above as "components," such components can comprise one or more components and/or modules, which can be part of a system, for performing operations attributed to each of the components.

In at least one example, the localization component 820, the perception component 114, the prediction component 824, and the planner component 826 can process data, as described above, and can send their respective outputs over the network(s) 830, to computing device(s) 126. In at least one example, the localization component 820, the perception component 114, the prediction component 824, and the planner component 826 can send their respective outputs to the computing device(s) 126 at a particular frequency, after a lapse of a predetermined period of time, in near real-time, etc.

In at least one example, the sensor system(s) 806 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 806 can provide input to the vehicle computing device(s) 804. In some examples, the sensor system(s) 806 can preprocess at least some of the sensor data prior to sending the sensor data to the vehicle computing device(s) 804. In at least one example, the sensor system(s) 806 can send sensor data, via the network(s) 830, to the computing device(s) 126 at a particular frequency, after a lapse of a predetermined period of time, in near real-time, etc.

The vehicle 802 can also include one or more emitters 808 for emitting light and/or sound, as described above. The emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 808 can be positioned at various locations about the exterior and/or interior of the vehicle 802.

The vehicle 802 can also include communication connection(s) 810 that enable communication between the vehicle 802 and other local or remote computing device(s), such as the computing device(s) 126, as well as other remote or local computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device(s) 804 to another computing device or a network, such as network(s) 830. For example, the communications connection(s) 810 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 812 can directly connect the drive system(s) 814 and other systems of the vehicle 802. In at least one example, the vehicle 802 can include drive system(s) 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include sensor component(s) to detect conditions of the drive system(s) 814 and/or the surroundings of the vehicle 802. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 814. In some cases, the sensor component(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle 802, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 814. Furthermore, the drive system(s) 814 also include communication connection(s) that enable communication by the respective drive system with other local or remote computing device(s).

In FIG. 8, the vehicle computing device(s) 804, sensor system(s) 806, emitter(s) 808, and the communication connection(s) 810 are shown onboard the vehicle 802. However, in some examples, the vehicle computing device(s) 804, sensor system(s) 806, emitter(s) 808, and the communication connection(s) 810 can be implemented outside of an actual vehicle (i.e., not onboard the vehicle 802).

As described above, the vehicle 802 can send data to the computing device(s) 126, via the network(s) 830. In some examples, the vehicle 802 can send raw sensor data to the computing device(s) 126. In other examples, the vehicle 802 can send processed sensor data and/or representations of sensor data to the computing device(s) 126 (e.g., data output from the localization component 820, the perception component 114, the prediction component 824, the planner component 826, the machine-learned models, etc.). In some examples, the vehicle 802 can send data to the computing device(s) 126 at a particular frequency, after a lapse of a predetermined period of time, in near real-time, etc.

The computing device(s) 126 can receive the data (raw or processed) from the vehicle 802 and/or other data collection devices, as well as data from one or more third party sources and/or systems. In at least one example, the computing device(s) 126 can include processor(s) 832 and memory 834 communicatively coupled with the processor(s) 832. In the illustrated example, the memory 834 of the computing device(s) 126 stores an error determination component 836, a scenario simulator component 838, the ground truth labeling component 110, and the error database 128. In some examples, one or more of the systems and/or components can be associated with the vehicle 802 or other computing device(s) associated with the system 800 instead of, or in addition to, being associated with the memory 834 of the computing device(s) 126.

The error determination component 836 includes functionality to identify one or more error(s) associated with outputs from the perception component 114 and/or one or more machine-learned models of the vehicle 802. For instance, the error determination component 836 may receive, as inputs, perception data from the perception component 114 and ground truth data from the ground truth labeling component 110. Based on these inputs, the error determination component 114 may determine one or more error(s) associated with the perception data. The error(s) may be stored or grouped in the form of tables, as described herein. In at least one example the error determination component 836 can include functionality to identify which errors are less than, equal to, or greater than a threshold error frequency that is associated with increasing a probability of the vehicle 802 experiencing a collision.

The scenario simulator component 838 may include functionality to generate simulated/alternative scenarios based on real/actual scenarios to determine whether an error associated with an output from the perception component 824 violates a perception system requirement. For instance, if the error or a magnitude of the error contributes to an adverse event in a alternative scenario, the error may be classified as violating a perception system requirement.

The processor(s) 816 of the vehicle 802 and the processor(s) 832 of the computing device(s) 126 can be any suitable processor capable of executing instructions to process data and perform operations as described herein. By way of example and not limitation, the processor(s) 816 and 832 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 834 are examples of non-transitory computer-readable media. Memory 818 and 834 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in some examples, components of the vehicle 802 can be associated with the computing device(s) 126 and/or the components of the computing device(s) 126 can be associated with the vehicle 802. That is, the vehicle 802 can perform one or more of the functions associated with the computing device(s) 126, and vice versa.

Furthermore, while the vehicle computing device(s) 804 and the computing device(s) 126 are shown to include multiple components, in some examples, such components can be associated with more or fewer individual components. For example, the localization component 820, the perception component 114, the prediction component 824, and/or the planner component 826 can be combined into a single component. Additionally, the error model generation component 836 and the ground truth labeling component 110 can be combined into a single component. That is, while depicted as separate components, any one or more of the components can be combined.

Figure 9:
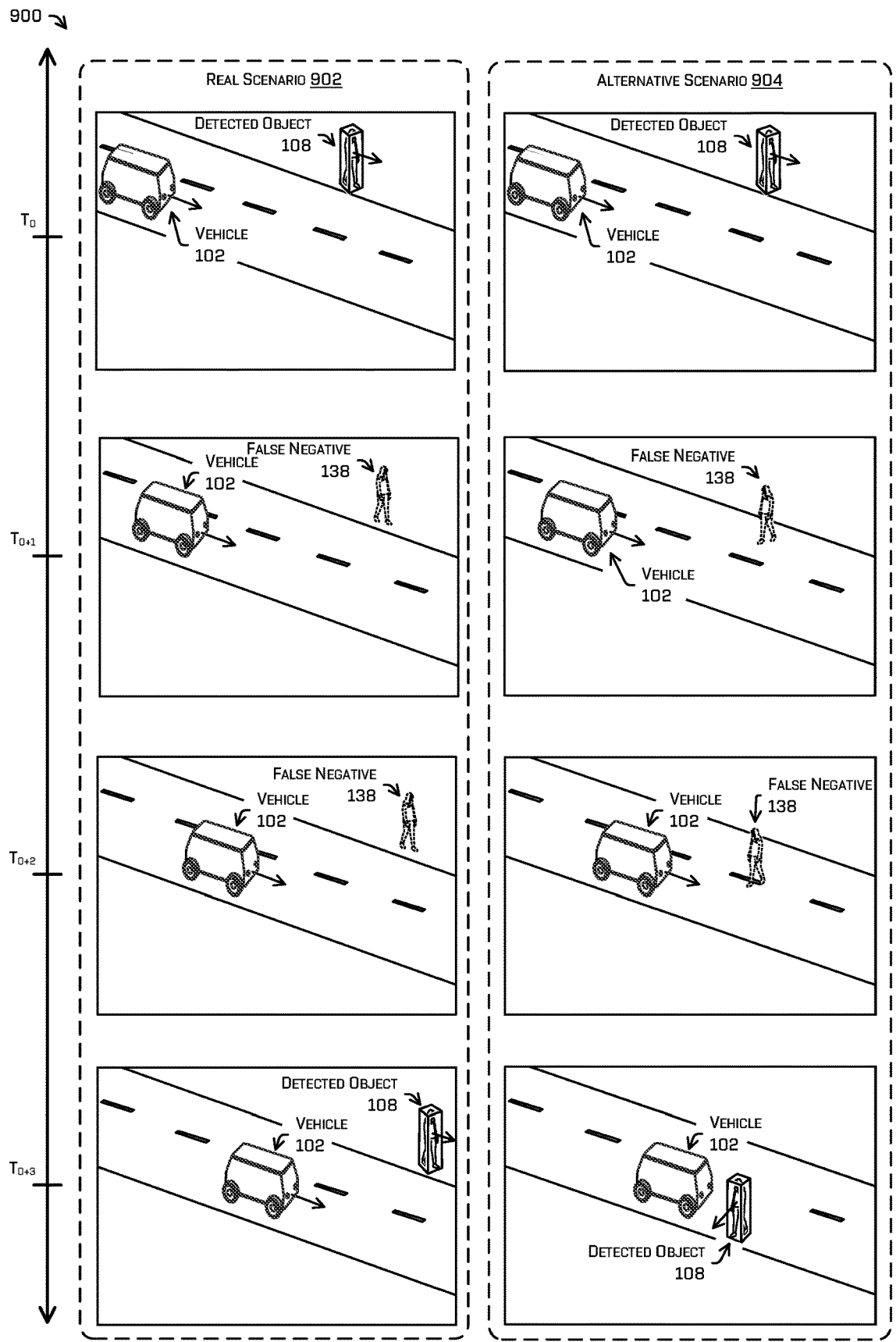
FIG. 9 illustrates a comparison between an example real scenario and an example alternative scenario for determining whether an error associated with an output of the perception system of the vehicle could contribute to an adverse event.

FIG. 9 illustrates a comparison 900 between an example real scenario 902 and an example alternative scenario 904 for determining whether an error associated with an output of the perception system of the vehicle could contribute to an adverse event. The error depicted in the comparison 900 is a false negative 138 in which the perception system failed to detect an object 108 in the environment. In some examples, the error depicted in the comparison 900 could be used to define or otherwise determine a perception system requirement.

The real scenario 902 and the alternative scenario 904 are each represented by a time-ordered sequence of frames corresponding with respective times. For instance, a first frame represents the environment at a time to, a second frame represents the environment at a time $t_{0+1}$, a third frame represents the environment at a time $t_{0+12}$, and so forth. In some examples, the frames may be image frames (e.g., image data) that is representative of other sensor data (e.g., lidar data, radar data, image data, etc.). In at least one example, the time-ordered sequence of frames are stored as log data associated with the vehicle 102.

During the real scenario 902, the vehicle 102 was traversing the environment and, during the false negative 138, the object 108 continued to maintain its trajectory. As such, in the time-ordered sequence of frames representing the real scenario 902, the false negative error did not contribute to an adverse event because the vehicle 102 maintained a safe distance between itself and the object 108.

However, as illustrated in the alternative scenario 904, it could have been possible for the object 108 (which is a pedestrian) to have altered its trajectory immediately at the start of the false negative error 138. That is, between time to and time $t_{0+1}$ of the alternative scenario 904, the object 108 alters its trajectory to begin crossing the street in front of the vehicle 102. However, it is not until time $t_{0+2}$ that the vehicle 102 re-detects the object 108 and stops. Thus, although an adverse event did not actually result in the real scenario 902 as logged by the vehicle 102, an adverse event could have resulted as determined in the alternative scenario 904. As such, the error (in this case the false negative 138) may be identified as an error of interest to be taken into further consideration for further development/improvement of the perception system of the vehicle 102, and as described herein. For instance, the error may be used to determine a perception system requirement, or may be used to compare against an already determined perception system requirement to determine whether the perception system is meeting requirements.

Figure 10:
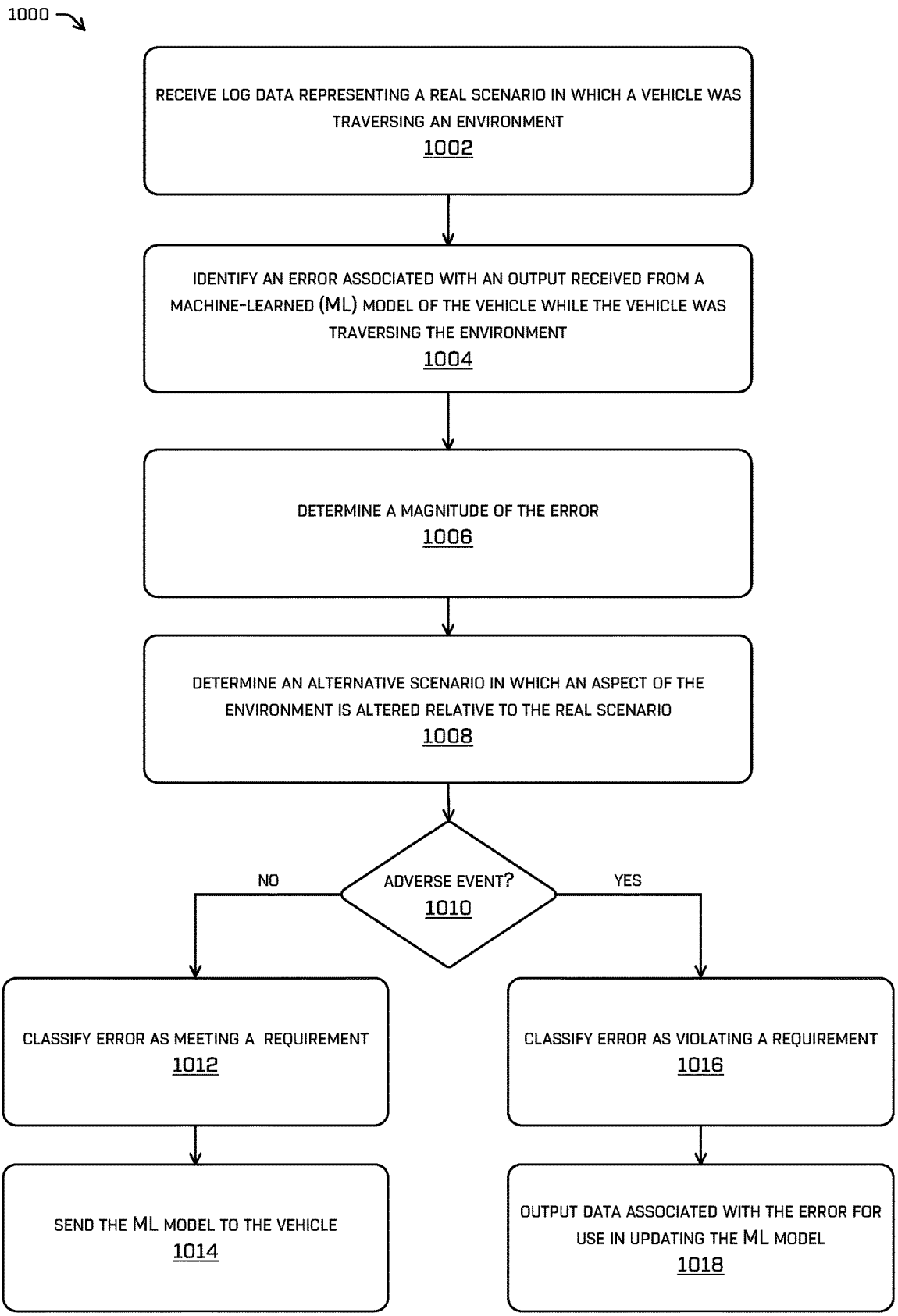
FIG. 10 is a flowchart illustrating an example process associated with determining whether an error associated with an output of the perception system of the vehicle could contribute to an adverse event in a alternative scenario based on a real scenario.

FIG. 10 is a flowchart illustrating an example process 1000 associated with determining whether an error associated with an output of the perception system of the vehicle could contribute to an adverse event in a alternative scenario based on a real scenario. By way of example, the process 1000 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 1000, the order in which the operations are described is not intended to be construed as a limitation, and any number of the described operations can be combined (or omitted) in any order and/or in parallel to implement the process 1000. In some examples, multiple branches represent alternate implementations that may be used separately or in combination with other operations discussed herein. The process 1000 illustrated may be described with reference to components and elements described above with reference to FIGS. 1 and/or 8 for convenience and ease of understanding. However, the process 1000 is not limited to being performed using these components, and the components are not limited to performing the process 1000.

The process 1000 begins at operation 1002, which includes receiving log data representing a real scenario in which a vehicle was traversing an environment. In some examples, the log data may comprise a time-ordered sequence of frames representing the real scenario, as described with resect to FIG. 9. In some examples, the computing device(s) 126 may receive the log data, which may comprise sensor data 106 captured by a vehicle 102.

At operation 1004, the process 1000 includes identifying an error associated with an output received from a machine-learned model of the vehicle while the vehicle was traversing the environment. For instance, the machine-learned model may be part of a perception system of the vehicle 102. In some examples, the error may be associated with detection of an object in the environment. For instance, the error may be a false positive error, false negative error, orientation error, velocity error, location error, size error, or the like.

At operation 1006, the process 1000 includes determining a magnitude of the error. In some examples, the magnitude of the error may comprise a duration of the error, a difference between the output and ground truth, or the like. For example, if the error is a location error, the magnitude may be a distance measurement between the actual location of the object and the perceived location of the object. Additionally, if the error is a false negative or false positive, the magnitude may be a duration of the error, in some examples. As another example, if the error is an orientation error, the magnitude may comprise a measurement of degrees in which the orientation of the actual object differs from the orientation of the perceived object.

At operation 1008, the process 1000 includes determining a alternative scenario in which a behavior of an object in the environment is altered relative to the real scenario. For instance, if the object in the real scenario maintained a straight trajectory, then in the alternative scenario the trajectory of the object may be varied (e.g., turn, stop, accelerate, etc.). As another example, a speed, size, velocity, position, orientation, or other attribute associated with the object may be changed from the real scenario to the alternative scenario.

At operation 1010, the process 1000 includes determining whether the error or the magnitude of the error contributes to an adverse event (e.g., collision, close-encounter, or other unsafe condition) in the alternative scenario. If the error or magnitude of the error does not contribute to an adverse event, then the process 1000 proceeds to operation 1012. However, if the error or magnitude of the error does contribute to an adverse event, then the process proceeds to operation 1016.

At operation 1012, the process 1000 includes classifying the error as meeting a requirement. For instance, the error may be classified as meeting a perception system or other machine-learned model requirement. At operation 1014, the process 1000 may include sending the machine-learned model to the vehicle. For instance, the machine-learned model may be sent to the vehicle 102 for use by the vehicle 102 to traverse the environment 104.

At operation 1016, the process 1000 includes classifying the error as violating a requirement. For instance, the error may be classified as violating a perception system or other machine-learned model requirement. At operation 1018, the process 1000 includes outputting data associated with the error for use in updating the machine-learned model. For instance, the computing device(s) 126 may output visualization data 132 associated with a visualization 136. In some examples, the visualization 136 may be based at least in part on log data, such as the ground truth data 112 and/or the perception data 116. In some instances, the developer(s) 134 may utilize the visualization to update the machine-learned model.

EXAMPLE CLAUSES

A. A system comprising: one or more processors; and one or more non-transitory computer-readable media storing instructions that, when executed by the one or more processors, cause the system to perform operations comprising: receiving log data associated with an autonomous vehicle, the log data representing a scenario including an environment; identifying, based at least in part on the log data, an error associated with an output received from a perception component of an autonomous vehicle, the perception component configured to detect objects in the environment; determining a magnitude of the error; determining that the magnitude of the error violates a perception requirement that is associated with detecting an object in the environment, the perception requirement established based at least in part on a determination that the magnitude of the error would contribute to a collision between the autonomous vehicle and the object in alternative scenarios in which an aspect associated with the object is altered across the alternative scenarios; and outputting at least a portion of the log data that is associated with the error for use in updating a machine-learned model associated with the perception component to meet the perception requirement.

B. The system as recited in paragraph A, wherein the determination that the magnitude of the error would contribute to the collision is based at least in part on a first principle analysis using one or more of: a velocity of the autonomous vehicle; a deceleration rate of the autonomous vehicle; a distance between the autonomous vehicle and the object; a velocity of the object; an acceleration of the object; or a reaction time associated with at least one of the autonomous vehicle or the object.

C. The system as recited in any one of paragraphs A-B, wherein the aspect associated with the object that is altered in the alternative scenario comprises one or more of: a velocity of the object; a trajectory of the object; a size of the object; or an orientation of the object.

D. The system as recited in any one of paragraphs A-C, wherein the perception requirement includes a worst-case value determined through use of the alternative scenarios in which aspects associated with the scenario are altered.

E. The system as recited in any one of paragraphs A-D, wherein the error is associated with a false-negative error in which the perception component failed to detect a presence of the object in the environment, and wherein the magnitude of the error comprises a duration of time for the false-negative error or a distance associated with the false-negative error.

F. A method comprising: receiving ground truth data associated with a scenario in an environment; determining, based at least in part on the ground truth data, an error associated with an output received from a machine-learned model of a perception component of a vehicle, the machine-learned model configured to detect objects in the environment; determining a magnitude of the error; determining that either: the magnitude of the error violates a requirement associated with detecting an object in the environment; or the magnitude of the error complies with the requirement, the requirement determined based at least in part on a determination that the magnitude of the error would contribute to an adverse event in another scenario; and outputting data associated with the error.

G. The method as recited in paragraph F, wherein the requirement includes a worst-case value determined through a use of multiple other scenarios in which aspects associated with the scenario are altered.

H. The method as recited in any one of paragraphs F-G, wherein the aspects altered in the multiple other scenarios are aspects related to the object, an environment in which the vehicle may operate, or a configuration of a component of the vehicle.

I. The method as recited in any one of paragraphs F-H, wherein the adverse event in the other scenario comprises at least one of a collision between the vehicle and the object or a violation of a comfort score requirement.

J. The method as recited in any one of paragraphs F-I, wherein the error is associated with a false-negative error in which the machine-learned model failed to detect a presence of the object in the environment.

K. The method as recited in any one of paragraphs F-J, wherein the magnitude of the error comprises a duration of time for the false-negative error or a distance associated with the false-negative error.

L. The method as recited in any one of paragraphs F-K, wherein the error is associated with a false-positive error in which the machine-learned model detected a presence of the object that was absent from the environment.

M. The method as recited in any one of paragraphs F-L, wherein the error comprises one or more of: a velocity error in which the output of the machine-learned model indicated a predicted velocity of the object that was different than an actual velocity of the object; a location error in which the output of the machine-learned model indicated a predicted location of the object that was different than an actual location of the object; an orientation error in which the output of the machine-learned model indicated a predicted orientation of the object that was different than an actual orientation of the object; a classification error in which the output of the machine-learned model indicated a predicted classification of the object that was different than an actual classification of the object; or a size error in which the output of the machine-learned model indicated a predicted size of the object that was different than an actual size of the object.

N. The method as recited in any one of paragraphs F-M, wherein the determination that the magnitude of the error would contribute to the adverse event is based at least in part at least one of: a speed of the vehicle; a deceleration rate of the vehicle; a distance between the vehicle and the object; a speed of the object; or a reaction time associated with the vehicle or the object.

O. The method as recited in any one of paragraphs F-N, wherein the data associated with the error includes a visualization representing at least one of the scenario or the other scenario.

P. The method as recited in any one of paragraphs F-O, wherein the visualization is generated based at least in part on the ground truth data, the ground truth data comprising sensor data generated by a sensor system of a vehicle traversing the environment.

Q. One or more non-transitory computer-readable media storing instructions that, when executed by one or more processors, cause the one or more processors to perform operations comprising: receiving ground truth data associated with an environment; determining, based at least in part on the ground truth data, an error associated with an output received from a machine-learned model of a perception component of a vehicle, the machine-learned model configured to detect objects in the environment; determining a magnitude of the error; determining that either: the magnitude of the error violates a requirement associated with detecting an object in the environment; or the magnitude of the error complies with the requirement, the requirement determined based at least in part on a determination that the magnitude of the error would contribute to an adverse event in another scenario; and outputting data associated with the error.

R. The one or more non-transitory computer-readable media as recited in paragraph Q, wherein the requirement includes a worst-case value determined through a use of multiple other scenarios in which aspects associated with the scenario are altered.

S. The one or more non-transitory computer-readable media as recited in any one of paragraphs Q-R, wherein the aspects altered in the multiple other scenarios are aspects related to the object, an environment in which the vehicle may operate, or a configuration of a component of the vehicle.

T. The one or more non-transitory computer-readable media as recited in any one of paragraphs Q-S, wherein the adverse event in the other scenario comprises at least one of a collision between the vehicle and the object or a violation of a comfort score requirement.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions that, when executed by the one or more processors, cause the system to perform operations comprising:
      receiving log data associated with an autonomous vehicle, the log data representing a scenario including an environment;
      identifying, based at least in part on the log data, an error associated with an output received from a perception component of an autonomous vehicle, the perception component configured to detect objects in the environment;
      determining a magnitude of the error;
      determining that the magnitude of the error violates a perception requirement that is associated with detecting an object in the environment, the perception requirement established based at least in part on a determination that the magnitude of the error would contribute to a collision between the autonomous vehicle and the object in alternative scenarios in which an aspect associated with the object is altered across the alternative scenarios; and
      outputting at least a portion of the log data that is associated with the error for use in updating a machine-learned model associated with the perception component to meet the perception requirement.

2. The system of claim 1, wherein the determination that the magnitude of the error would contribute to the collision is based at least in part on a first principle analysis using one or more of:
   a velocity of the autonomous vehicle;
   a deceleration rate of the autonomous vehicle;
   a distance between the autonomous vehicle and the object;
   a velocity of the object;
   an acceleration of the object; or
   a reaction time associated with at least one of the autonomous vehicle or the object.

3. The system of claim 1,
   wherein the aspect associated with the object that is altered in the alternative scenario comprises one or more of:
   a velocity of the object;
   a trajectory of the object;
   a size of the object; or
   an orientation of the object.

4. The system of claim 1, wherein the perception requirement includes a worst-case value determined through use of the alternative scenarios in which aspects associated with the scenario are altered.

5. The system of claim 1, wherein the error is associated with a false-negative error in which the perception component failed to detect a presence of the object in the environment, and wherein the magnitude of the error comprises a duration of time for the false-negative error or a distance associated with the false-negative error.

6. A method comprising:
   receiving ground truth data associated with a scenario in an environment;

determining, based at least in part on the ground truth data, an error associated with an output received from a machine-learned model of a perception component of a vehicle, the machine-learned model configured to detect objects in the environment;

determining a magnitude of the error;

determining that either:
  (1) the magnitude of the error violates a requirement associated with detecting an object in the environment; or
  (2) the magnitude of the error complies with the requirement, the requirement determined based at least in part on a determination that the magnitude of the error would contribute to an adverse event in another scenario; and outputting data associated with the error.

7. The method of claim 6, wherein the requirement includes a worst-case value determined through a use of multiple other scenarios in which aspects associated with the scenario are altered.

8. The method of claim 7, wherein the aspects altered in the multiple other scenarios are aspects related to the object, an environment in which the vehicle may operate, or a configuration of a component of the vehicle.

9. The method of claim 6, wherein the adverse event in the other scenario comprises at least one of a collision between the vehicle and the object or a violation of a comfort score requirement.

10. The method of claim 6, wherein the error is associated with a false-negative error in which the machine-learned model failed to detect a presence of the object in the environment.

11. The method of claim 10, wherein the magnitude of the error comprises a duration of time for the false-negative error or a distance associated with the false-negative error.

12. The method of claim 6, wherein the error is associated with a false-positive error in which the machine-learned model detected a presence of the object that was absent from the environment.

13. The method of claim 6, wherein the error comprises one or more of:
  a velocity error in which the output of the machine-learned model indicated a predicted velocity of the object that was different than an actual velocity of the object;
  a location error in which the output of the machine-learned model indicated a predicted location of the object that was different than an actual location of the object;
  an orientation error in which the output of the machine-learned model indicated a predicted orientation of the object that was different than an actual orientation of the object;
  a classification error in which the output of the machine-learned model indicated a predicted classification of the object that was different than an actual classification of the object; or
  a size error in which the output of the machine-learned model indicated a predicted size of the object that was different than an actual size of the object.

14. The method of claim 6, wherein the determination that the magnitude of the error would contribute to the adverse event is based at least in part at least one of:
  a speed of the vehicle;
  a deceleration rate of the vehicle;
  a distance between the vehicle and the object;
  a speed of the object; or
  a reaction time associated with the vehicle or the object.

15. The method of claim 6, wherein the data associated with the error includes a visualization representing at least one of the scenario or the other scenario.

16. The method of claim 15, wherein the visualization is generated based at least in part on the ground truth data, the ground truth data comprising sensor data generated by a sensor system of a vehicle traversing the environment.

17. One or more non-transitory computer-readable media storing instructions that, when executed by one or more processors, cause the one or more processors to perform operations comprising:
  receiving ground truth data associated with an environment;
  determining, based at least in part on the ground truth data, an error associated with an output received from a machine-learned model of a perception component of a vehicle, the machine-learned model configured to detect objects in the environment;
  determining a magnitude of the error;
  determining that either:
    (1) the magnitude of the error violates a requirement associated with detecting an object in the environment; or
    (2) the magnitude of the error complies with the requirement, the requirement determined based at least in part on a determination that the magnitude of the error would contribute to an adverse event in another scenario; and
  outputting data associated with the error.

18. The one or more non-transitory computer-readable media of claim 17, wherein the requirement includes a worst-case value determined through a use of multiple other scenarios in which aspects associated with the scenario are altered.

19. The one or more non-transitory computer-readable media of claim 18, wherein the aspects altered in the multiple other scenarios are aspects related to the object, an environment in which the vehicle may operate, or a configuration of a component of the vehicle.

20. The one or more non-transitory computer-readable media of claim 17, wherein the adverse event in the other scenario comprises at least one of a collision between the vehicle and the object or a violation of a comfort score requirement.

* * * * *